(12) United States Patent
Grochowski et al.

(10) Patent No.: US 10,579,378 B2
(45) Date of Patent: Mar. 3, 2020

(54) INSTRUCTIONS FOR MANIPULATING A MULTI-BIT PREDICATE REGISTER FOR PREDICATING INSTRUCTION SEQUENCES

(71) Applicant: Intel Corporation, Santa Clara, CA (US)

(72) Inventors: Edward T. Grochowski, San Jose, CA (US); Victor W. Lee, Santa Clara, CA (US); Sergey A. Rozhkov, Santa Clara, CA (US); Boris A. Babayan, Moscow (RU)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 14/228,016

(22) Filed: Mar. 27, 2014

(65) Prior Publication Data

US 2015/0277910 A1 Oct. 1, 2015

(51) Int. Cl.
*G06F 9/30* (2018.01)

(52) U.S. Cl.
CPC ........ *G06F 9/30076* (2013.01); *G06F 9/3005* (2013.01); *G06F 9/3013* (2013.01); *G06F 9/30072* (2013.01); *G06F 9/30094* (2013.01); *G06F 9/30101* (2013.01); *G06F 9/30134* (2013.01)

(58) Field of Classification Search
CPC .... G06F 8/4452; G06F 8/452; G06F 9/30029; G06F 9/30032; G06F 9/3005; G06F 9/30065; G06F 9/30072; G06F 9/30094; G06F 9/30101; G06F 9/30076
See application file for complete search history.

(56) References Cited

U.S. PATENT DOCUMENTS

| | | | |
|---|---|---|---|
| 5,632,023 A | 5/1997 | White et al. | |
| 6,983,361 B1* | 1/2006 | Blandy | G06F 9/30061 712/229 |
| 2002/0091996 A1* | 7/2002 | Topham | G06F 8/452 717/124 |

(Continued)

OTHER PUBLICATIONS

Intel, "IA-64 Application Developer's Architecture Guide", May 1999, p. 7-127.*

(Continued)

*Primary Examiner* — David J. Huisman
(74) *Attorney, Agent, or Firm* — Nicholson De Vos Webster & Elliott LLP

(57) ABSTRACT

An apparatus and method are described for executing instructions using a predicate register. For example, one embodiment of a processor comprises: a register set including a predicate register to store a set of predicate condition bits, the predicate condition bits specifying whether results of a particular predicated instruction sequence are to be retained or discarded; and predicate execution logic to execute a first predicate instruction to indicate a start of a new predicated instruction sequence by copying a condition value from a processor control register in the register set to the predicate register. In a further embodiment, the predicate condition bits in the predicate register are to be shifted in response to the first predicate instruction to free space within the predicate register for the new condition value associated with the new predicated instruction sequence.

24 Claims, 16 Drawing Sheets

(56) References Cited

U.S. PATENT DOCUMENTS

2002/0144092 A1* 10/2002 Topham ................ G06F 8/4452
712/217
2005/0125645 A1    6/2005 Rudd et al.
2006/0149944 A1    7/2006 Eisen et al.
2010/0287358 A1   11/2010 Emma et al.
2011/0078415 A1*  3/2011 Johnson .............. G06F 9/30021
712/208

OTHER PUBLICATIONS

Final Office Action from U.S. Appl. No. 14/465,652, dated Jul. 31, 2017, 32 pages.
Non-Final Office Action from U.S. Appl. No. 14/465,652, dated Mar. 14, 2017, 30 pages.

* cited by examiner

INSTRUCTIONS FOR MANIPULATING A MULTI-BIT PREDICATE REGISTER FOR PREDICATING INSTRUCTION SEQUENCES

BACKGROUND

Field of the Invention

This invention relates generally to the field of computer processors. More particularly, the invention relates to a method and apparatus for implementing a nested predicate register.

Description of the Related Art

Computer programs consist of a set of instructions intended to be executed on a computer system to perform some useful task. Typically, programs are designed to execute certain instructions conditionally, i.e., if one or more conditions are satisfied then the conditional instructions will be executed otherwise they will not be executed. In this context, "executed" means that an instruction performs a specified operation which will result in a modification of the state of the computer system and/or result in a particular sequence of events within the computer system. In traditional computer systems, conditional execution is implemented via a branch or jump instruction well known in the art. "Predicated execution" or "predication" (sometimes referred to as "conditional execution" or "guarded execution") is a technique whereby instructions can be executed conditionally without the need for a branch instruction.

Predicated execution is implemented by associating a "predicate" with an instruction where the predicate controls whether or not that instruction is executed. If the predicate evaluates to "true," the instruction is executed; if the predicate evaluates to "false," the instruction is not executed. The definition of "true" and "false" may vary with each implementation. The function by which the predicate is determined to be true or false may also vary with each implementation. For example, some embodiments may define the predicate to be a single bit where a value of one is true and a value of zero is false while alternate embodiments may define the predicate to be multiple bits with a specific function for interpreting these bits to be true or false.

By conditionally executing instructions under the control of a predicate, predication eliminates branch instructions from the computer program. This is beneficial on wide and deep pipelines where the flushes due to branch mispredictions causes several "bubbles" in the execution pipeline, giving rise to a significant loss of instruction execution opportunities. Predication improves performance by eliminating branches, and thus any associated branch mispredictions. Since branch instructions typically cause breaks in the instruction fetch mechanism, predication also improves performance by increasing the number of instructions between branches, thus increasing the effective instruction fetch bandwidth.

Predicates are typically stored in a dedicated "predicate register set." The exact form of the predicate register set may vary with each implementation. For example, some embodiments may define a plurality of registers each containing a single predicate while alternate embodiments may define the predicates to be one or more bits in a "condition code" or "flags" register. The exact number of predicates may also vary. For example, one processor architecture may define 64 predicates while another may define only 8 predicates.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
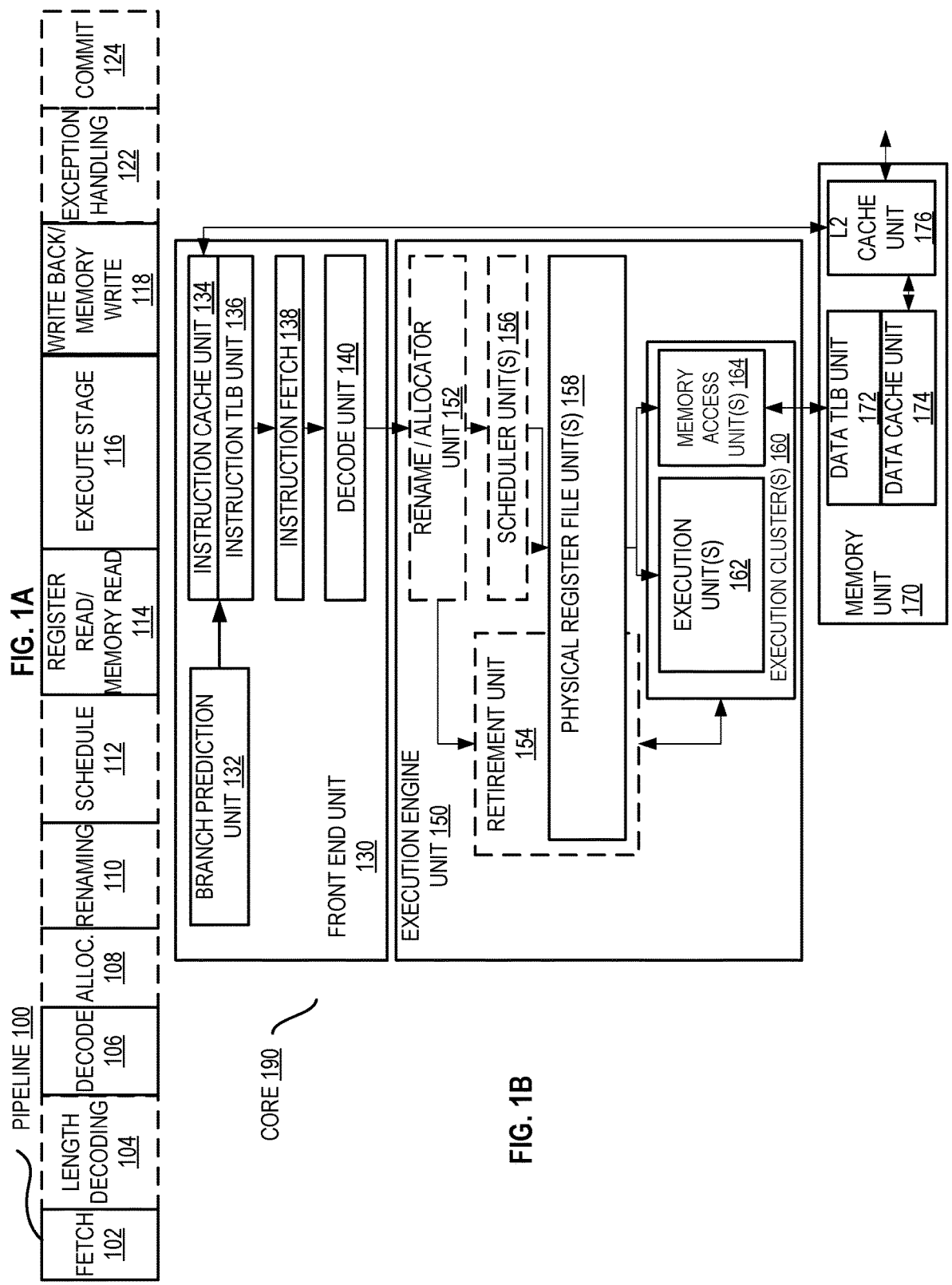
FIG. 1A is a block diagram illustrating both an exemplary in-order fetch, decode, retire pipeline and an exemplary register renaming, out-of-order issue/execution pipeline according to embodiments of the invention.
FIG. 1B is a block diagram illustrating both an exemplary embodiment of an in-order fetch, decode, retire core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file unit(s) 158. Each of the physical register file units(s) 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file unit(s) 158 comprises a vector registers unit, a write mask registers unit, and a scalar registers unit. These register units may provide architectural vector registers, vector mask registers, and general purpose registers. The physical register file unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file unit(s) 158, and execution cluster (s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit(s), and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file unit(s) 158 and the memory unit 170 perform the register read/memory read stage 114; the execution cluster 160 perform the execute stage 116; 6) the memory unit 170 and the physical register file unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
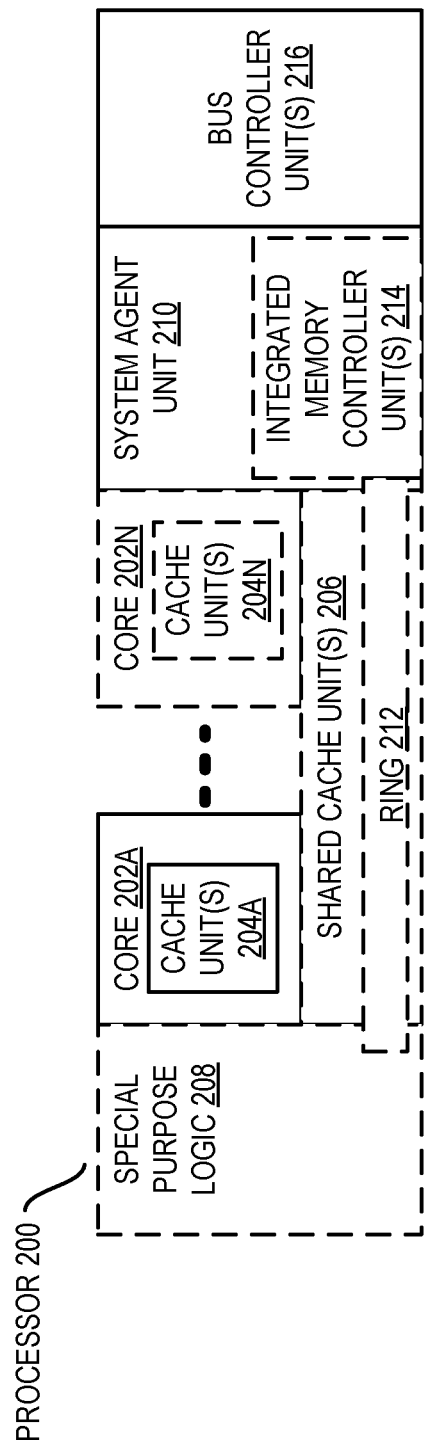
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208. Each of the multiple cores 202A-N may include respective cache unit(s) 204A-N.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
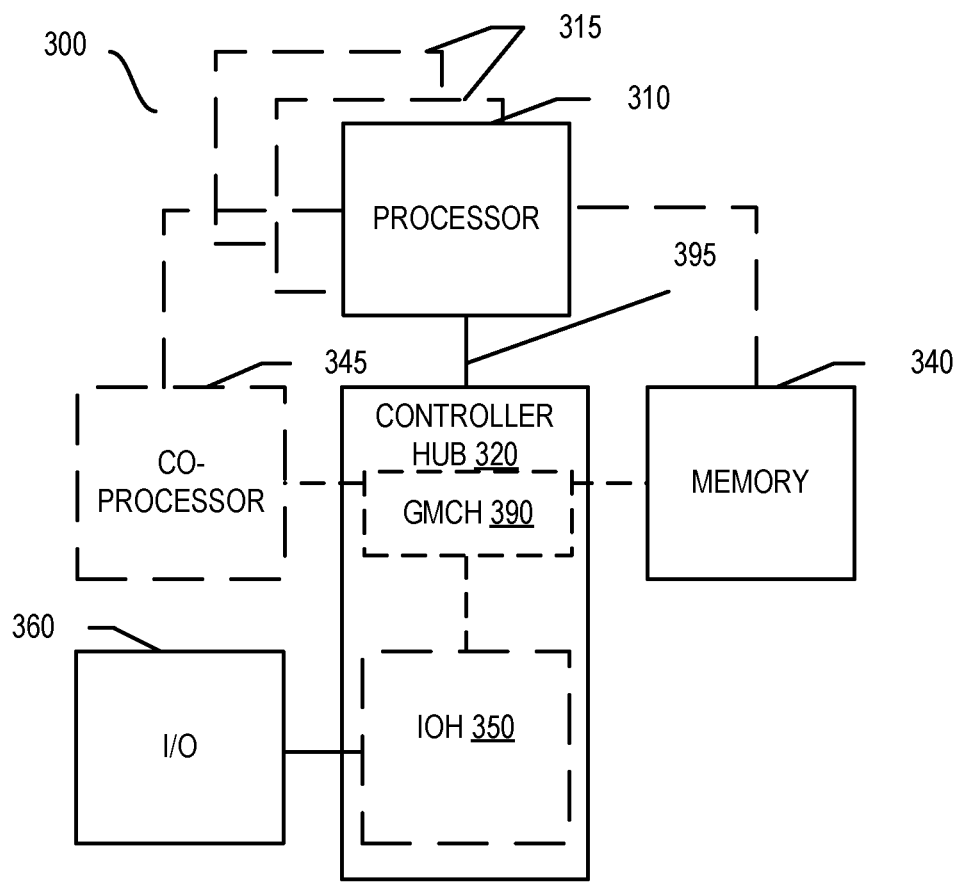
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
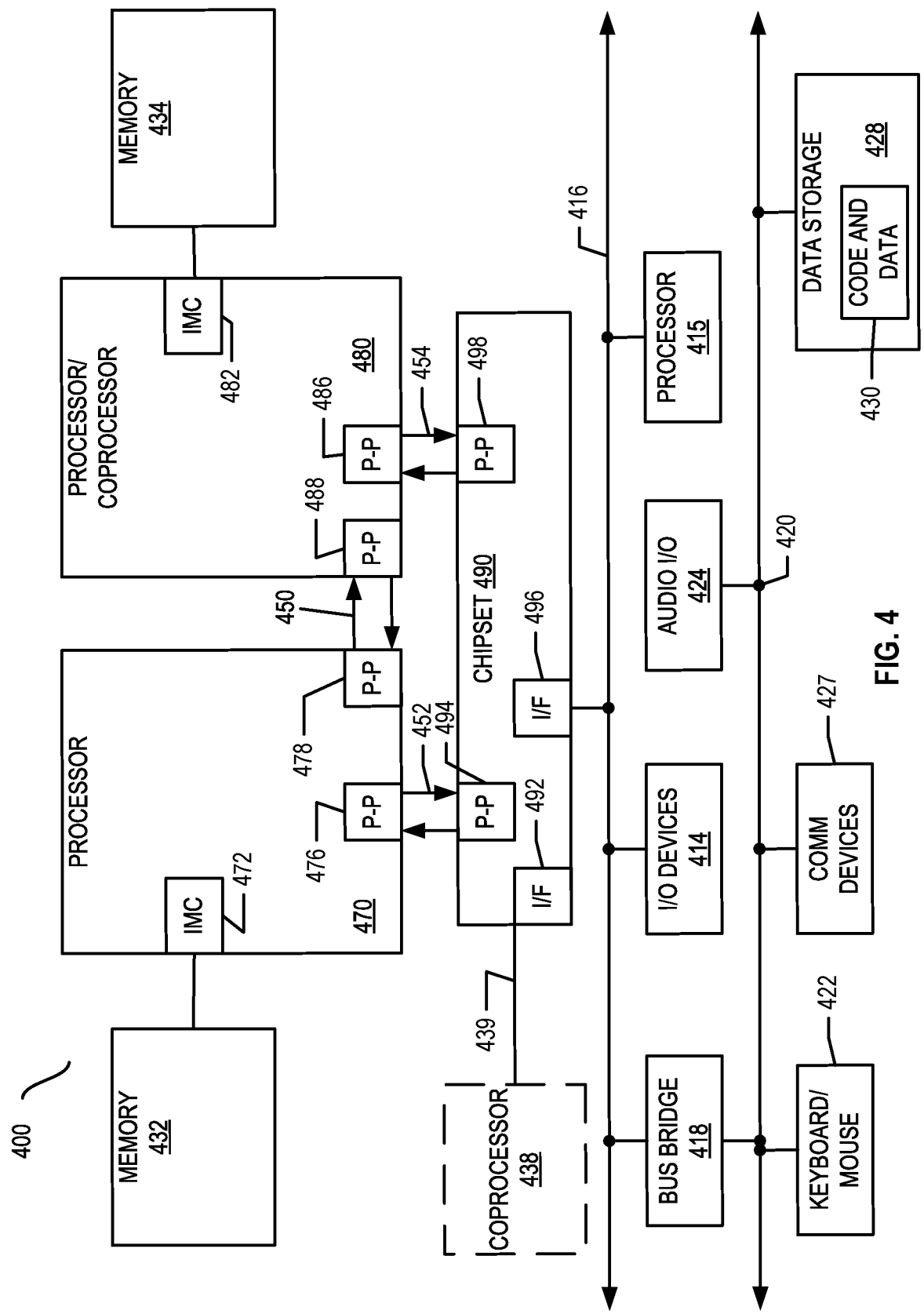
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 492 through connection 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
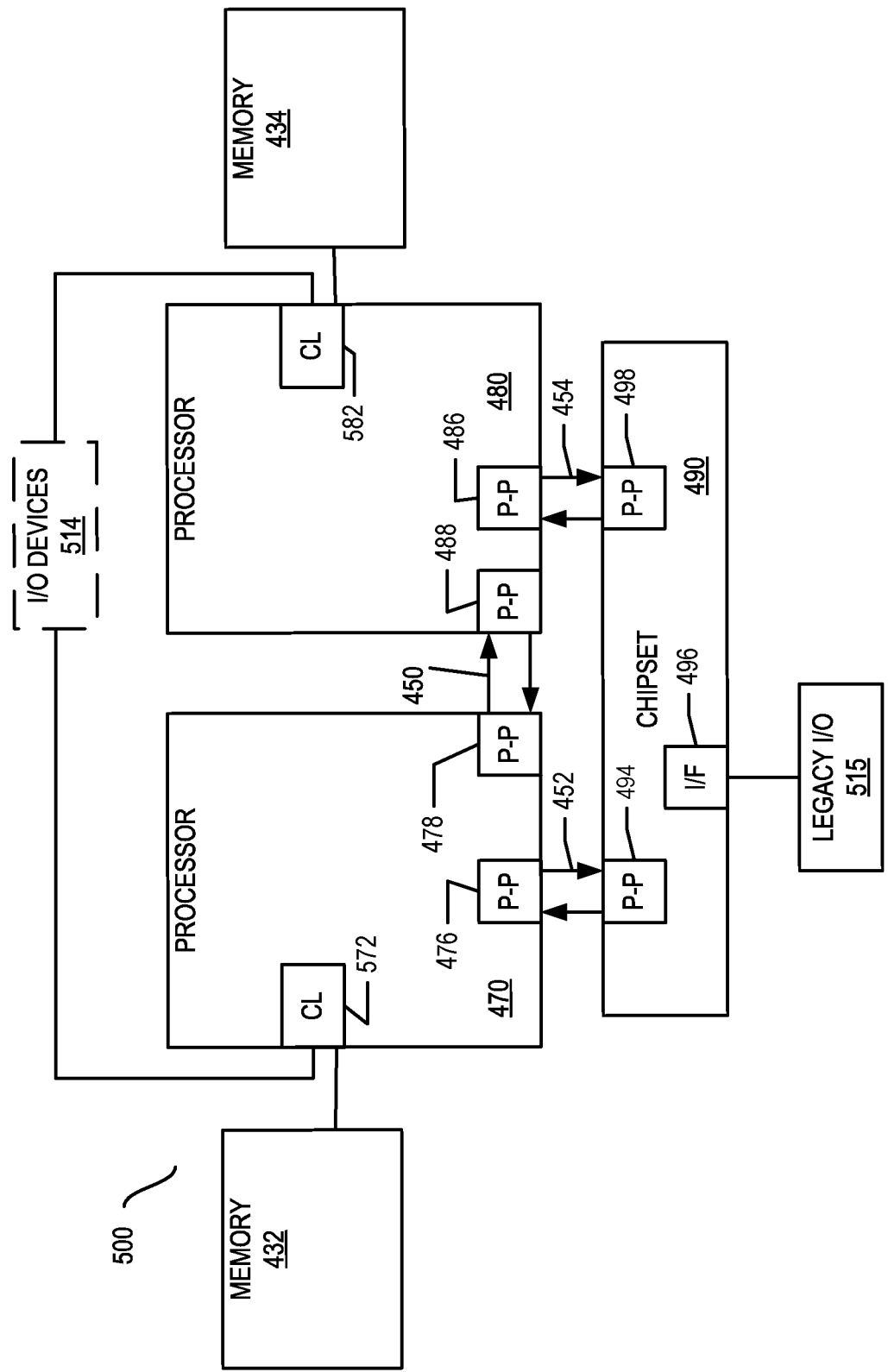
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 572 and 582, respectively. Thus, the CL 572, 582 include integrated memory controller units and include I/O control logic. FIG. 5 illustrates that not only are the memories 432, 434 coupled to the CL 572, 582, but also that I/O devices 514 are also coupled to the control logic 572, 582. Legacy I/O devices 515 are coupled to the chipset 490.

Figure 6:
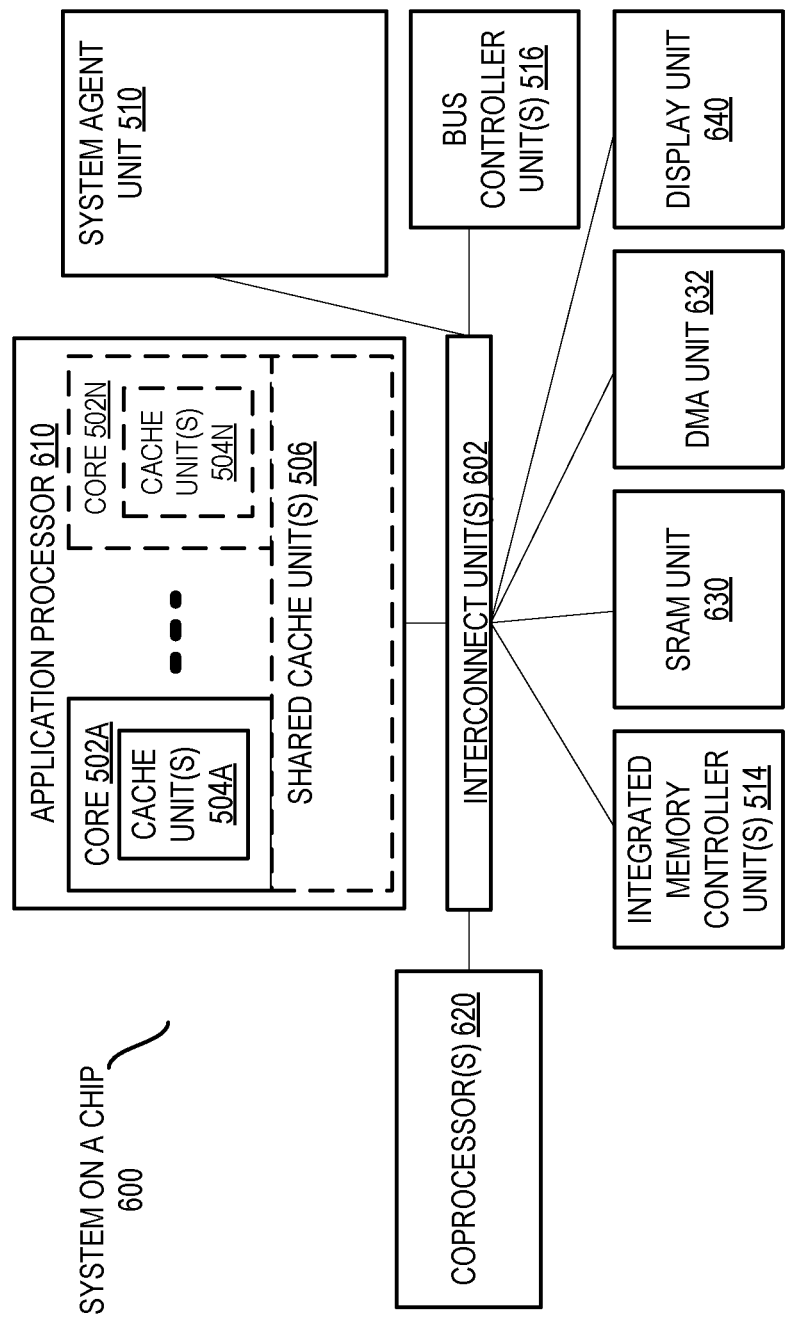
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 502A-N, each of which including respective cache unit(s) 504A-N, and shared cache unit(s) 506; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
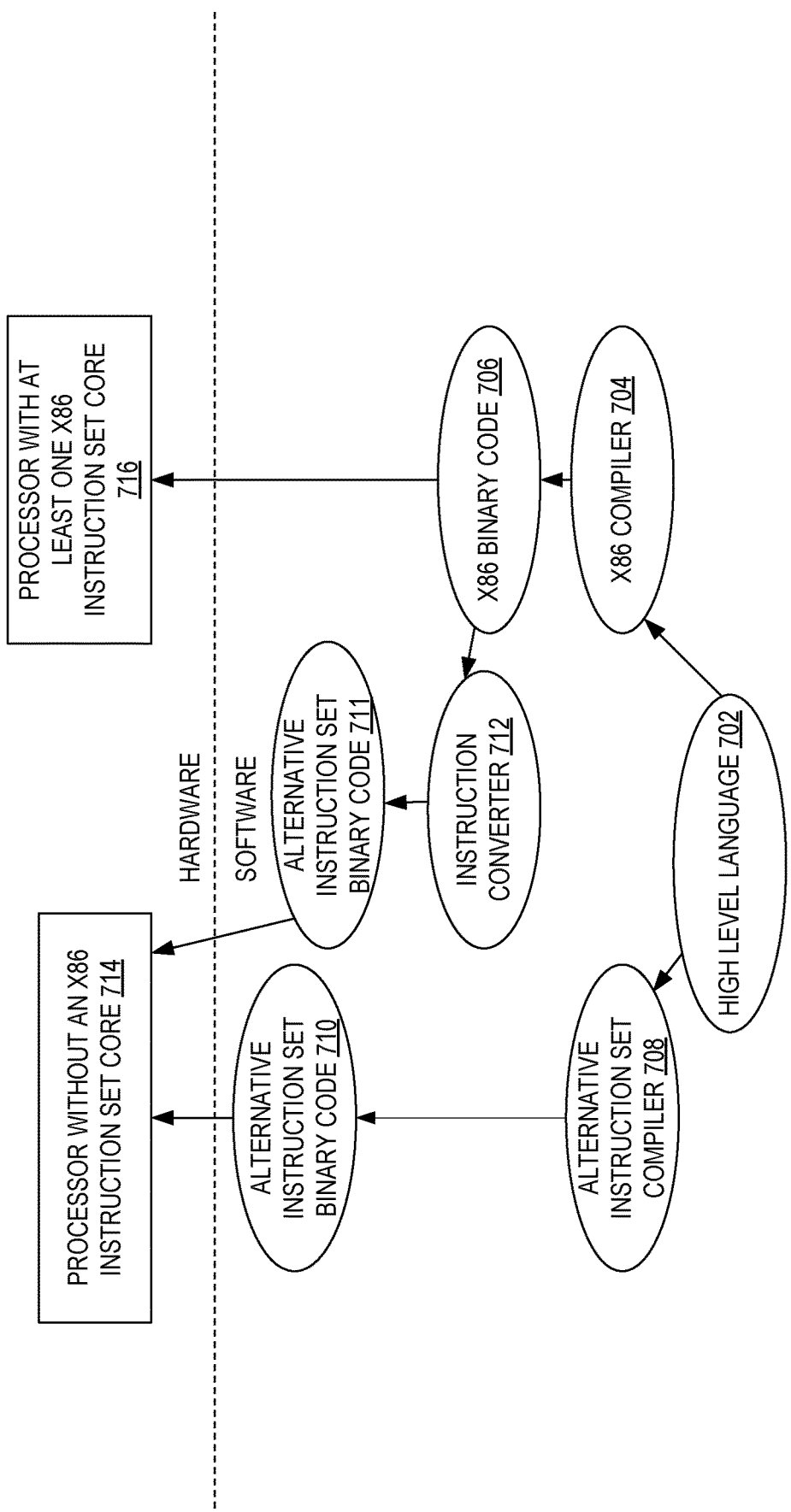
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code 711 that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Method and Apparatus for Executing Instructions Using a Predicate Register

One embodiment of the invention provides architectural extensions for adding predication to existing processor/instruction set architectures (e.g., including but not limited to the Intel Architecture (IA)). Predication offers both performance and energy benefits by eliminating pipeline flushes due to hard-to-predict branches.

In existing processor architectures, (e.g., Itanium® and Itanium 2®, designed by the assignee of the present application), every instruction contains a qualifying predicate field, thereby increasing the length of each instruction. To address this inefficiency, one embodiment of the invention specifies a condition once, at the beginning of a particular instruction sequence and executes the entire instruction sequence according the condition, thereby alleviating the need to predicate each instruction individually.

One particular embodiment adds a nested predicate register to the processor architecture along with a new set of predicate instructions to push, complement, and pop conditions from this register (described in detail below). Rather than predicating individual instructions, all instructions between the push and pop are predicated, thus avoiding the redundancy of specifying the same predicate for multiple consecutive instructions. The predicate register may be used to govern the execution of normal arithmetic, logical, load, and store instructions. In one embodiment, if all condition bits of the predicate register are true, the predicated instructions may be executed. If any condition bits of the predicate register are false, the set of predicated instructions are skipped.

In addition, one embodiment introduces new predicate instructions which provide the ability to add a new condition, complement the last condition, remove a condition from the predicate register, and load/store the predicate register to memory. These embodiments eliminate the need to predicate individual instructions. Instead, the condition may be specified once at the beginning of the predicated instruction sequence.

Figure 8:
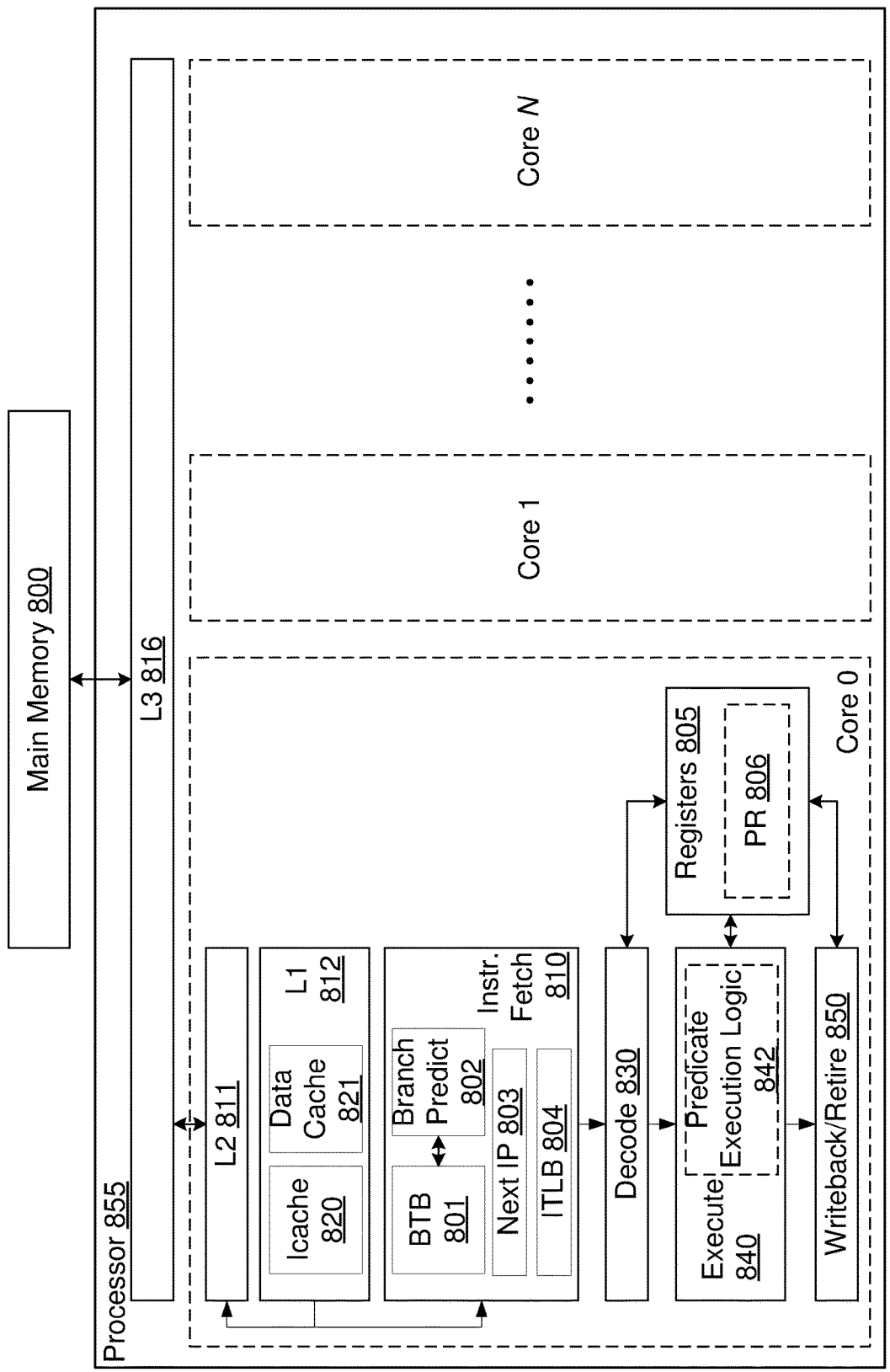
FIG. 8 illustrates one embodiment of a system architecture for implementing a predicate register.

As illustrated in FIG. 8, an exemplary processor 855 on which embodiments of the invention may be implemented includes an execution unit 840 with predicate execution logic 842 to execute the predicate instructions described herein. A register set 805 provides register storage for operands, control data and other types of data as the execution unit 840 executes the instruction stream (including predicate register storage, as discussed below with respect to FIG. 9).

The details of a single processor core ("Core 0") are illustrated in FIG. 8 for simplicity. It will be understood, however, that each core shown in FIG. 8 may have the same set of logic as Core 0. As illustrated, each core may also include a dedicated Level 1 (L1) cache 812 and Level 2 (L2) cache 811 for caching instructions and data according to a specified cache management policy. The L1 cache 812 includes a separate instruction cache 820 for storing instructions and a separate data cache 821 for storing data. The instructions and data stored within the various processor caches are managed at the granularity of cache lines which may be a fixed size (e.g., 64, 128, 512 Bytes in length). Each core of this exemplary embodiment has an instruction fetch unit 810 for fetching instructions from main memory 800 and/or a shared Level 3 (L3) cache 816; a decode unit 830 for decoding the instructions (e.g., decoding program instructions into micro-operatons or "uops"); an execution unit 840 for executing the instructions (e.g., the predicate instructions as described herein); and a writeback unit 850 for retiring the instructions and writing back the results.

The instruction fetch unit 810 includes various well known components including a next instruction pointer 803 for storing the address of the next instruction to be fetched from memory 800 (or one of the caches); an instruction translation look-aside buffer (ITLB) 804 for storing a map of recently used virtual-to-physical instruction addresses to improve the speed of address translation; a branch prediction unit 802 for speculatively predicting instruction branch addresses; and branch target buffers (BTBs) 801 for storing branch addresses and target addresses. Once fetched, instructions are then streamed to the remaining stages of the instruction pipeline including the decode unit 830, the execution unit 840, and the writeback unit 850. The structure and function of each of these units is well understood by those of ordinary skill in the art and will not be described here in detail to avoid obscuring the pertinent aspects of the different embodiments of the invention.

Figure 9:
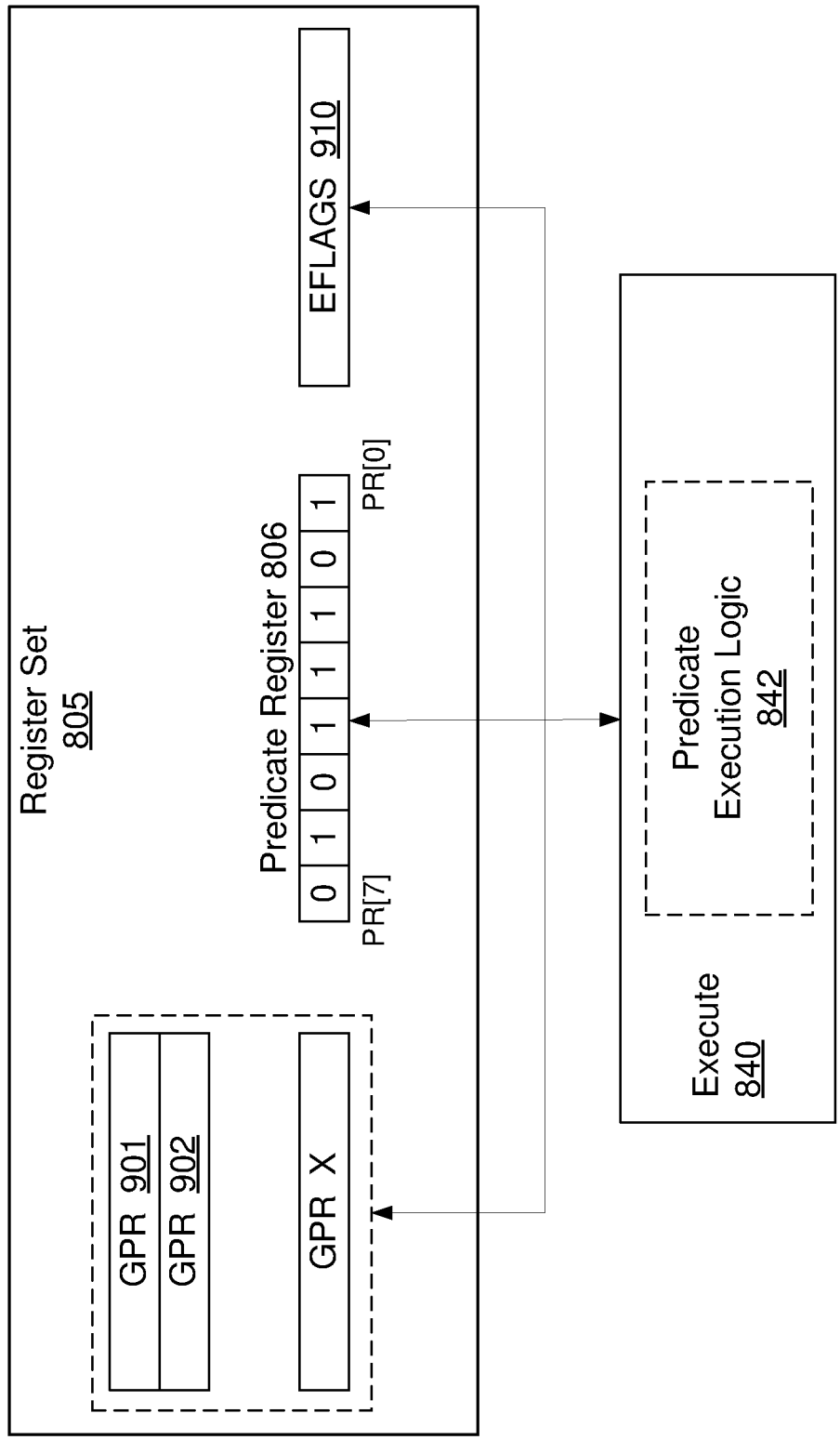
FIG. 9 illustrates a plurality of registers including a predicate register in accordance with one embodiment.

As illustrated in FIG. 9, in one embodiment, the register set 805 includes a predicate register (PR) 806 comprised of a set of predicate condition bits which may be set and managed in response to predicate instructions executed by the predicate execution logic 842. An 8-bit predicate register is illustrated in FIG. 9, but various other register sizes may be used (e.g., 16 bits, 32 bits, 64 bits, etc).

The register set 805 may also include multiple sets of general purpose registers (GPRs) 901, 902, X and an EFLAGS register 910. The EFLAGS register 910 is a control register containing a group of status flags, a control flag, and a group of system flags. Various existing instructions may write to and read from the EFLAGS register 910. The specific flags and the manner in which the EFLAGS register is utilized is well understood by those of skill in the art and will not be described here in detail to avoid obscuring the underlying principles of the invention. Moreover, various additional register types may be present in the register set 805 while still complying with the underlying principles of the invention (e.g., vector registers, SIMD registers, etc).

Even though a single instance of each register is illustrated in FIG. 9 for simplicity, one of ordinary skill in the art will understand that multiple physical versions of the GPRs 901-X, predicate registers 806, and EFLAGS register 910 may be maintained using register renaming techniques. For example, each physical version may represent a different stage of execution of the instruction pipeline. In one embodiment, only a single architectural version of each register is maintained based on the stage of execution as indicated by a current instruction pointer. The multiple physical versions may be used, for example, so that older states of execution may be recovered (i.e., the processor may roll-back execution) in the event of an exception, interrupt, or other condition. In one embodiment, the multiple physical versions of the GPRs may be produced with different predicates (as discussed below).

In one embodiment, the predicate register 806 includes a single condition bit per entry. The predicate condition bits may be set, copied and managed according to the set of predicate instructions set forth in Table A below.

TABLE A

Predicate Instructions

| Instruction | Description |
|---|---|
| IFP CC | Shift PR left. Assign condition code to PR[0]. |
| ELSEP N | Set PR[0] to ANDed together complement of PR[0 . . . N − 1]. Shift PR bits (other than PR[0]) right (N − 1) times, setting any new bits that are shifted-in (e.g. a new PR[MSB]) to 1. Any bit that would normally shift into PR[0] is discarded. |
| ENDP N | Set EFLAGS.ZF to ANDed together PR[0 . . . N − 1]. Shift PR right N times, setting any new bits that are shifted-in (e.g. a new PR[MSB]) to 1. If not specified, "N" deafults to 1. |
| MOVP mem, PR | Store PR to memory |
| MOVP PR, mem | Load memory to PR |

In one embodiment, a new predicated instruction sequence is marked with an IFP instruction. When the predicated instruction sequence begins, the predicate execution logic 842 executing the IFPCC instruction may shift the predicate register 806 to the left and copy the condition code from the EFLAGS register 910 into the predicate register 806 (i.e., at PR[0]). Creating a copy of the condition code in this manner overcomes the limitation in certain architectures (e.g., such as IA) which have only a single EFLAGS register 910. Subsequent instructions may then modify the EFLAGS register without affecting the already-specified condition governing the predicated sequence.

In one embodiment, the value of N in the ELSEP N and ENDP N instructions is the number of prior IFP instructions (i.e., the IFPs which are part of the same nested block of program code). As discussed below, the value of N causes the predication register to be shifted by different amounts, thereby accounting for the nested operations by setting any new bits that are shifted into predicate register as a result of performing the shift, such as a new most significant bit (MSB).

In response to executing the ELSEP N instruction, the predicate execution logic 842 sets PR[0] to the ANDed together complement of PR[0 . . . N−1]. It causes the predicate register 806 bits (other than bit 0) to shift right (N−1) times, setting any new bits that are shifted into the predicate register as a result of performing the shift, such as new most significant bit (PR[MSB]). Note that to preserve the newly set value in PR[0], a bit that would normally shift into PR[0] as a result of the shift operation is considered shifted out and discarded.

In one embodiment, in response to executing the ENDP N instruction, the predicate execution logic 842 sets the zero flag (ZF) of the EFLAGS register 910 (EFLAGS.ZF) to the ANDed together result of PR[0 . . . N-1]. It shifts the predicate register 806 right N times, setting any new bits that are shifted into the predicate register as a result of performing the shift, such as a new most significant bit (PR[MSB]). If not specified, "N" defaults to 1 and the zero flag is set to PR[0]. In one embodiment, in response to the predicate execution logic 842 executing the MOVP mem, PR and MOVP PR, mem instructions, the predicate register values are stored to, or loaded from memory, respectively.

In one embodiment, predicate semantics are added to existing arithmetic, load, and store instructions to take advantage of nested predication as described herein. In particular, rather than reading the EFLAGS register, the instruction semantics may be changed so that the instructions read values from the predicate register. These instructions may be executed, for example, only if there are no predicate register bits set equal to 0. This definition enables multiple conditions specified in the predicate register bits to be logically ANDed together. By specifying via predicate semantics in this manner, a separate predicate field does not need to be added to existing instructions (i.e., the opcodes and/or prefix of the existing instructions do not need to be modified, thereby simplifying the implementation of the predication techniques described herein).

Figure 10:
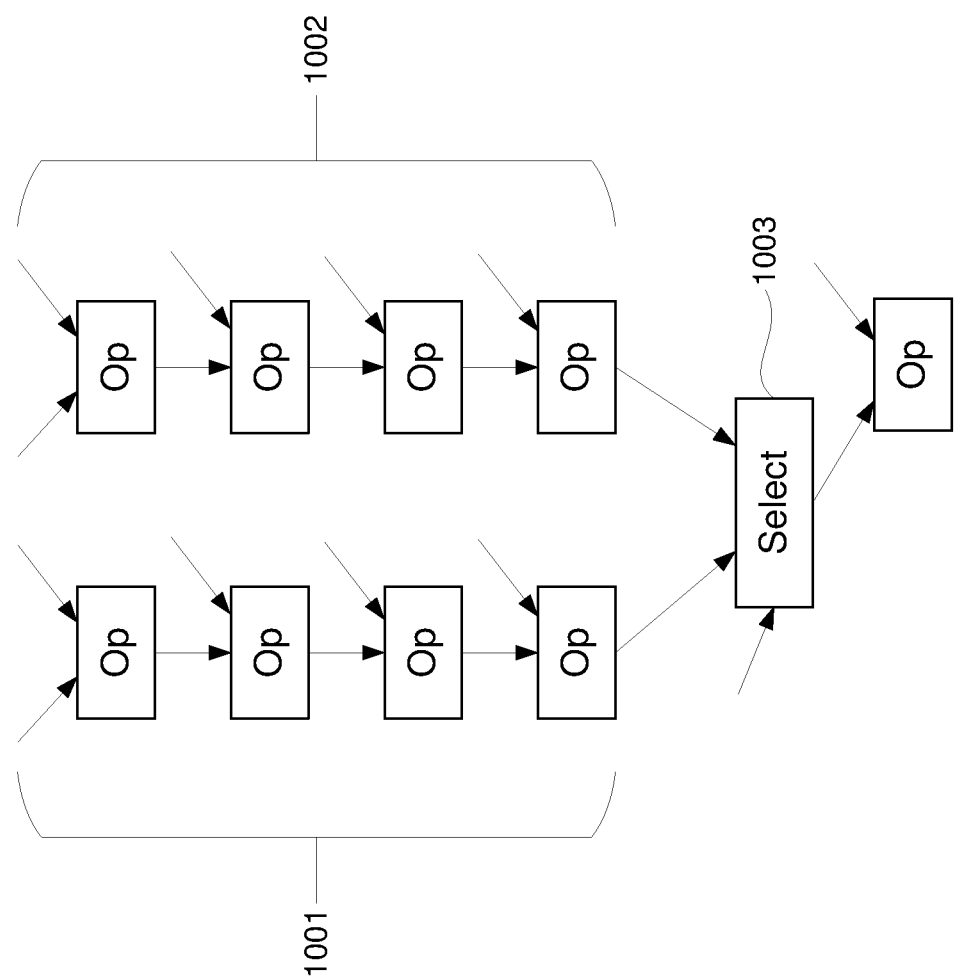
FIG. 10 illustrates one embodiment of a select operation controlled by the values in the predicate register for selecting between predicated instructions sequences.

The embodiments of the invention provide for a range of implementations. For example, one implementation may convert the predicated instruction sequence into select operations. As illustrated in FIG. 10, a select operation 1003, under the control of a value from the predication register, selects between the results of a first instruction sequence 1001 or a second instruction sequence 1002 to generate the result. In one embodiment, a select operation may either select the new result stored in a general purpose register if the predicate is "true" (as indicated by the predicate register) or copies the existing general purpose register operand into itself if the predicate is false. Always writing the destination register makes register dependency tracking easy for existing out-of-order micro architectures. In one embodiment, memory dependencies are managed by adding a predicate bit to existing load/store buffers.

The following source code is designed to increment the value in register RBX, retrieve a value from memory and store it in RAX, and shift RAX left by 1 if the value in register RAX is not equal to 1. If the value in RAX is equal to 1, then the value in RCX is set to 0.

```
if (rax!=1) {
    ++rbx;
    rax=*mem;
    rax=rax << 1;
} else {
    rcx=0;
}
```

Using the predication techniques described herein, the above source code may be compiled into the following assembly language code:

```
cmp rax,1
ifpnz
    inc rbx
    mov rax,[mem]
    shl rax,1
elsep
    mov rcx,0
endp
```

By placing the "inc," "mov," and "shl" instructions between the "ipf" and "endp," these instructions become predicated by the condition specified in the "ifp" instruction By way of another example, the following source code is nested (i.e., multiple conditions are nested):

```
if (rax!=3) {
    if (rbx==rcx) ++rcx;
    rdx=4;
    rax=*mem;
}
```

Using the predication techniques described herein, the above source code may be compiled into the following assembly language code:

```
cmp rax,3
ifpnz
    cmp rbx,rcx
    ifpz
        inc rcx
    endp
    mov rdx,4
    mov rax,[mem]
endp
```

As mentioned, MOVP instructions may be used to load and store the predicate register to memory. In addition, on an exception or interrupt, one embodiment of the predicate execution logic 842 pushes the predicate register onto the stack. In one embodiment, a return from interrupt (IRET) may restore the predicate register from the stack. One way to implement this with existing stack frames is to alias the predicate register to the unused upper bits of the EFLAGS register.

By way of another example, the following source code

```
if (a==0 && b==0) {
    ++c;
    x=23;
} else {
    --c;
    x=13;
}
``` may be compiled into the following assembly language code, using the predication techniques described herein, for N=1 (i.e., for ELSEP 1):

```
cmpq $0,a
ifpz
    cmpq $0,b
    ifpz
        addq $1,c
        movl $23,x
    elsep
        subq $1,c
```

```
        movl $13,x
    endp
elsep
    subq $1,c
    movl $13,x
    endp
```

In addition, the following assembly language code is generated for N=2 (i.e., for ENDP 2):

```
cmpq $0,a
ifpz
    cmpq $0,b
    ifpz
        addq $1,c
        movl $23,x
    elsep
        subq $1,c
        movl $13,x
    endp 2
```

The foregoing examples are provided for the purposes of illustration of one embodiment of the invention. The underlying principles of the invention are not limited to any specific set of source code or resulting assembly code.

Figure 11:
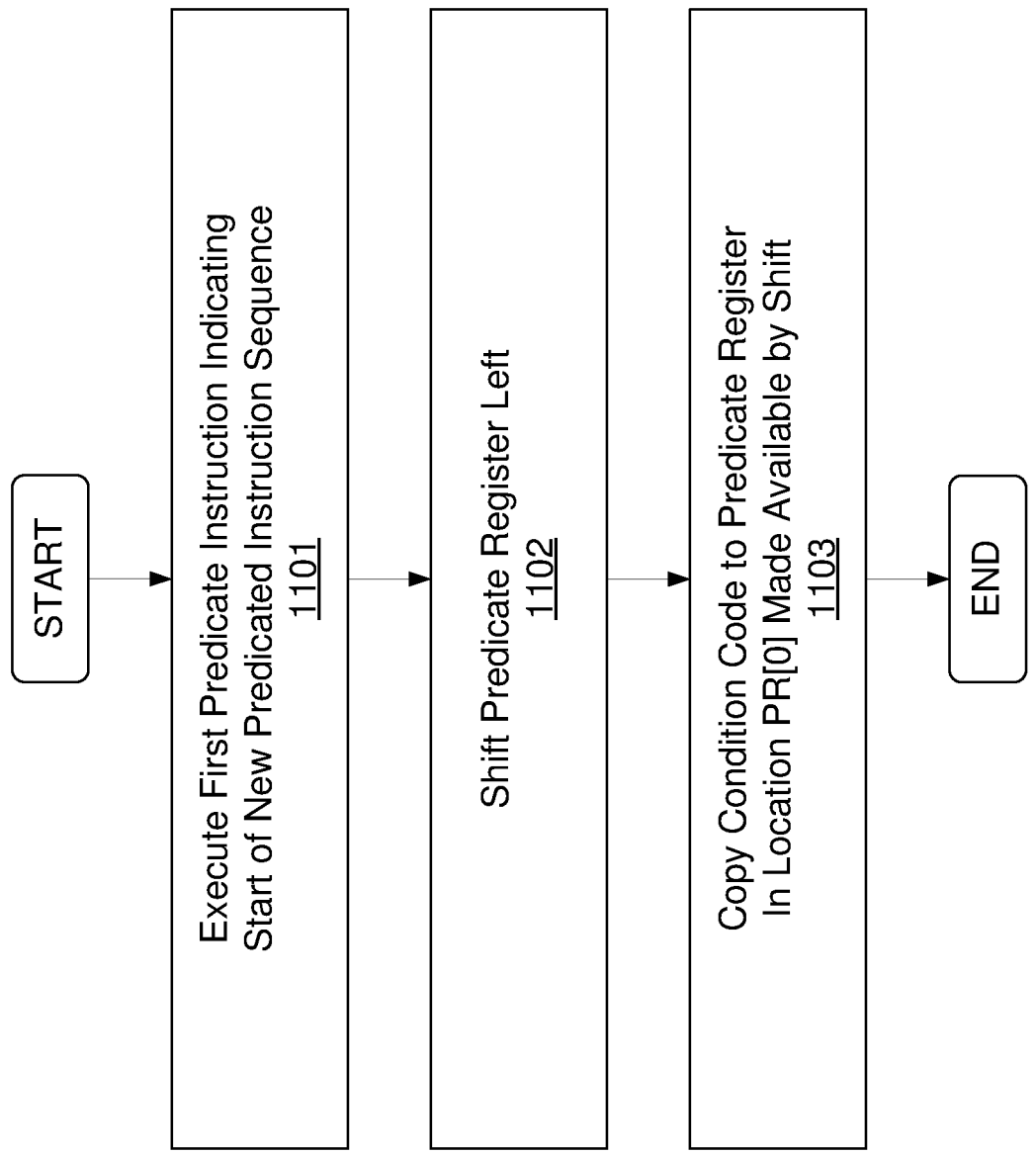
FIG. 11 illustrates one embodiment of a method for implementing a first predicate instruction.

FIG. 11 illustrates a series of operations resulting from the execution of a first predicate instruction such as IFP indicating the start of a new predicated instruction sequence. At 1101, the first predicate instruction is executed. In response, at 1102, the values in the predicate register are shifted left. At 1103, the condition code is copied from a processor control register (e.g., EFLAGS) to location PR[0] which was made available by the shift operation.

Figure 12:
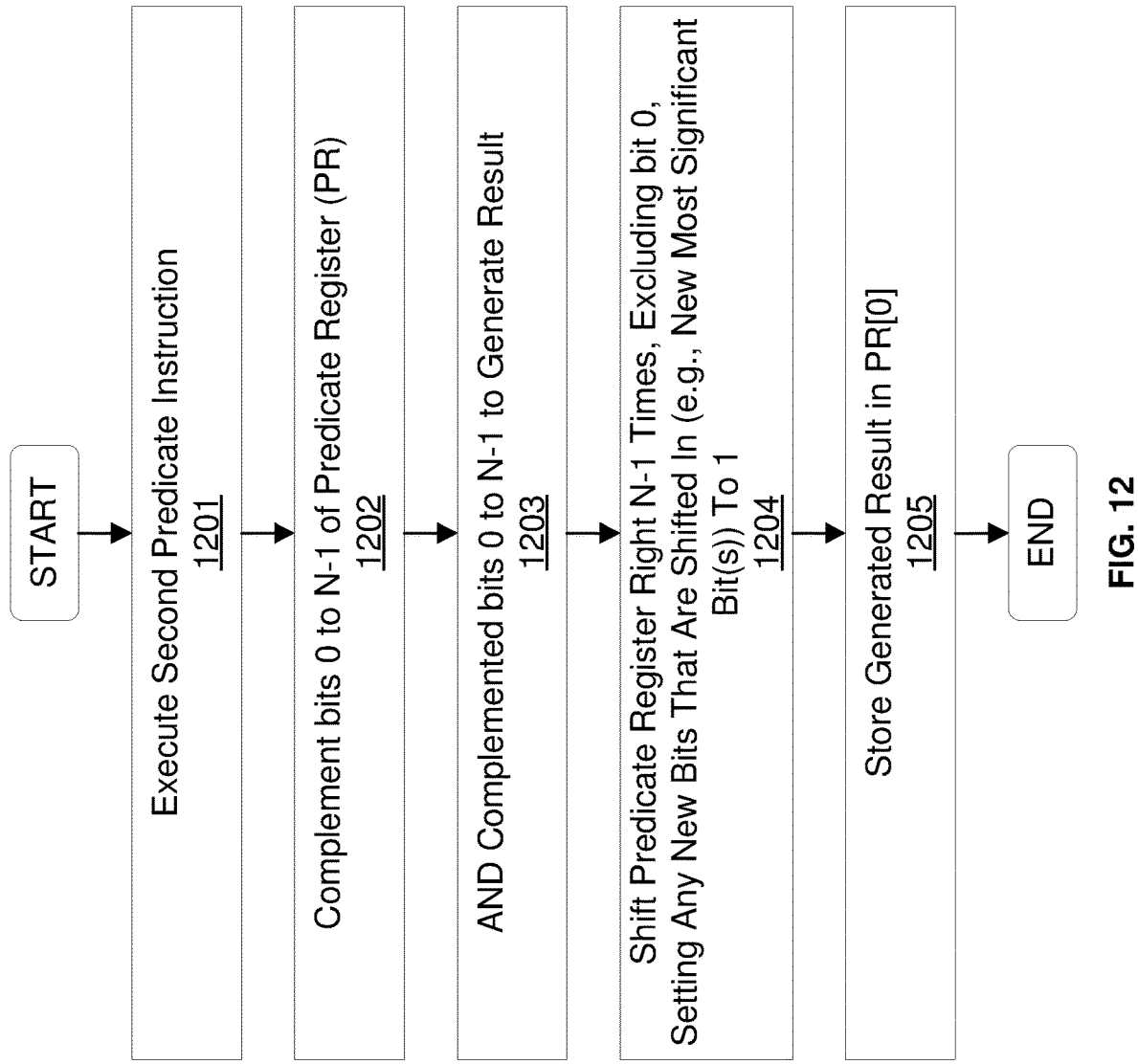
FIG. 12 illustrates one embodiment of a method for implementing a second predicate instruction.

FIG. 12 illustrates a series of operations resulting from the execution of a second predicate instruction such as ELSEP N, for N>1. At 1201, the second predicate instruction is executed. In response, at 1202, bits 0 to N−1 of the predicate register are complemented. As mentioned, the value of N may be the number of prior first predicate instructions (e.g., IFP instructions) within the same nested block of program code. At 1203, an AND operation is performed ob the complemented bits to generate a result. At 1204, the predicate register is shifted right N−1 times, thereby setting the N−1 most significant bits of the predicate register. At 1205, the generated result is stored in the predicate register at PR[0].

Figure 13:
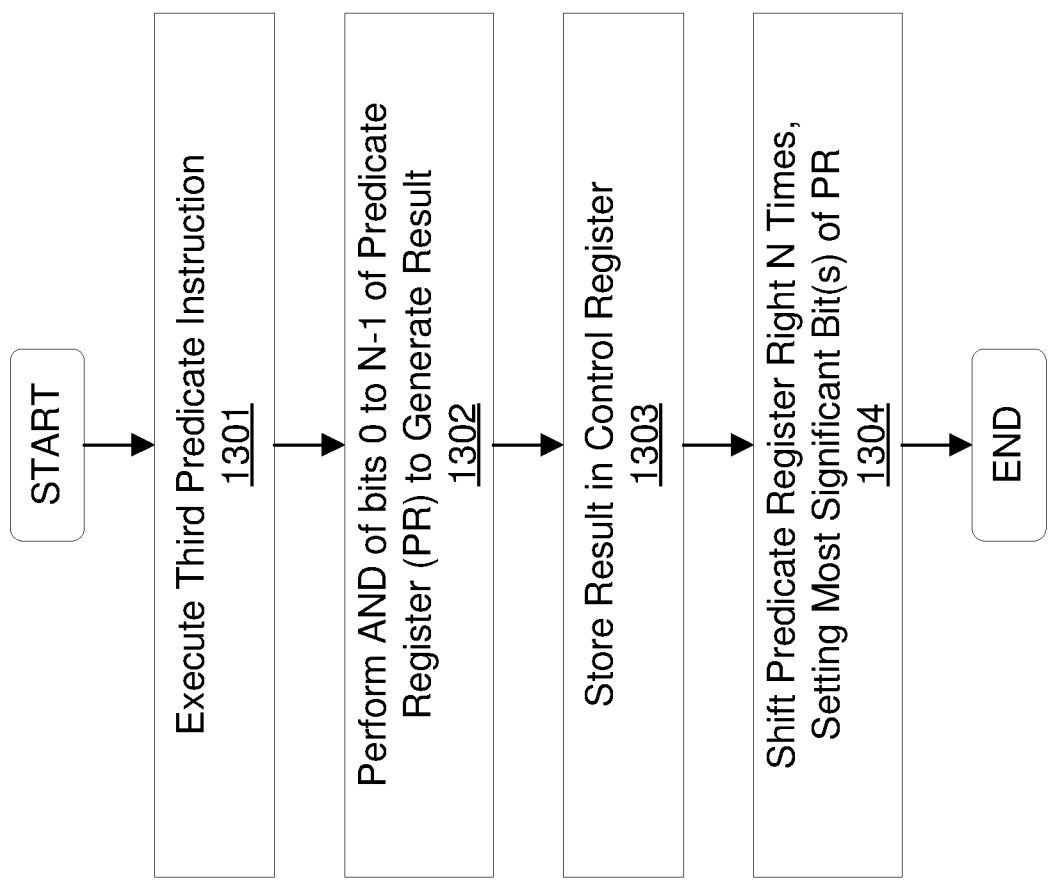
FIG. 13 illustrates one embodiment of a method for implementing a third predicate instruction.

FIG. 13 illustrates a series of operations resulting from the execution of a second predicate instruction such as ENDP N, for N>1. At 1301, the third predicate instruction is executed. In response, at 1302, an AND operation is performed on bits 0 to N−1 of the predicate register to generate a result. At 1303, the result is stored in a control register (e.g., in the zero flag (ZF) location of the EFLAGS register in one embodiment). At 1304, the predicate register is shifted to the right N times, thereby setting the N most significant bit in the predicate register.

Figure 14:
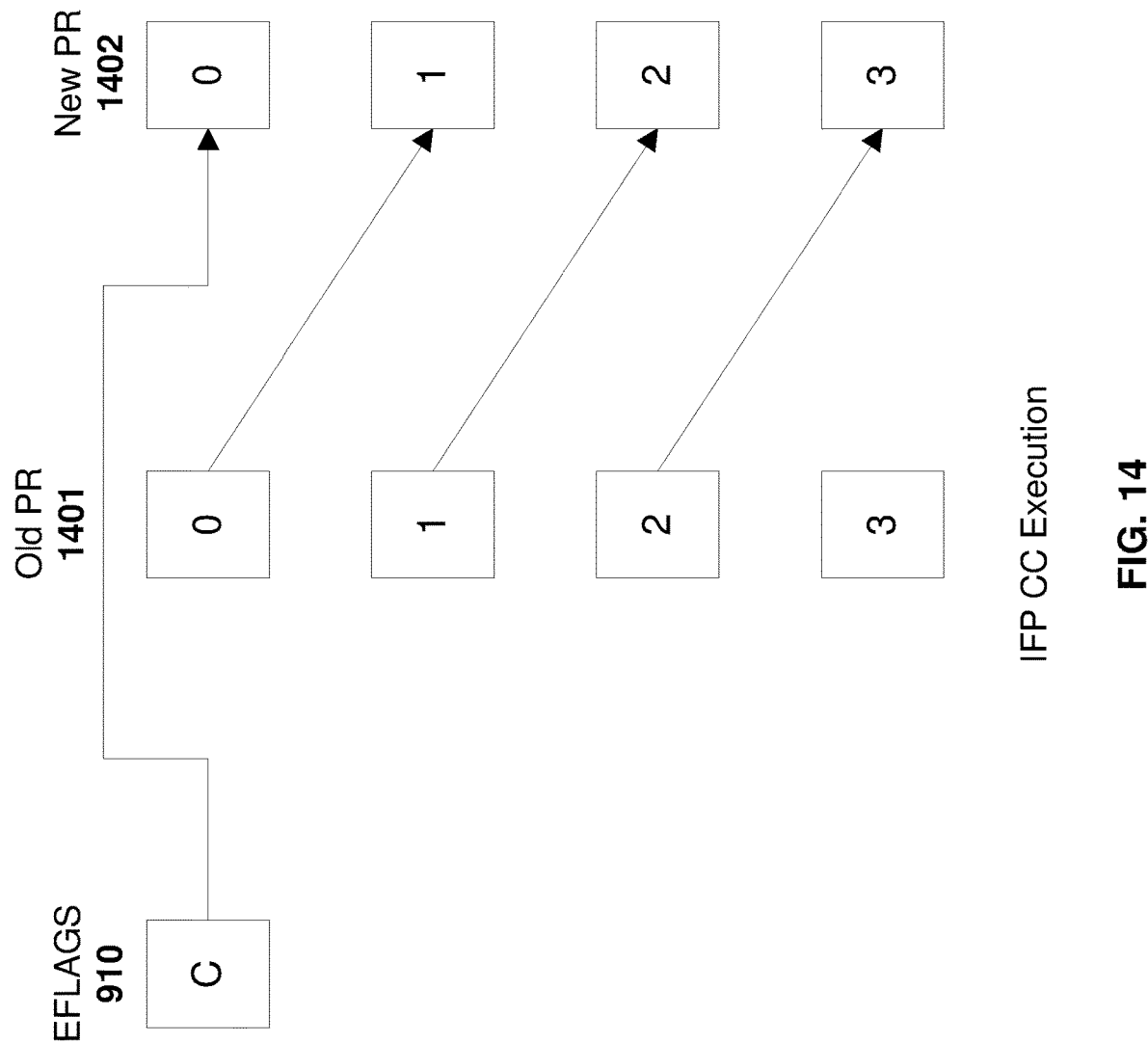
FIG. 14 illustrates register operations associated with an IFP instruction in accordance with one embodiment of the invention.

FIGS. 14-16 graphically demonstrate how the predicate register bits are updated in response to the IFP, ELSEP, and ENDP instructions in accordance with one embodiment of the invention. As illustrated in FIG. 14, the bits in the old PR 1401 are shifted left. Thus, the bit in bit position 0 is moved to 1, the bit in bit position 1 is moved to 2, etc, within the new PR register 1402. The condition code value (c) from ELFAGS 910 is copied to the bit position 0 of the new PR (i.e., PR[0]) either concurrently with or following the shift operation.

It should be noted that the terms "old" and "new" do not necessarily mean that a different physical register is used. Rather, the same physical PR may be used but the terms "old" and "new" refer to the old data and new data, respectively, generated by the predicate register operations described herein.

Figure 15B:
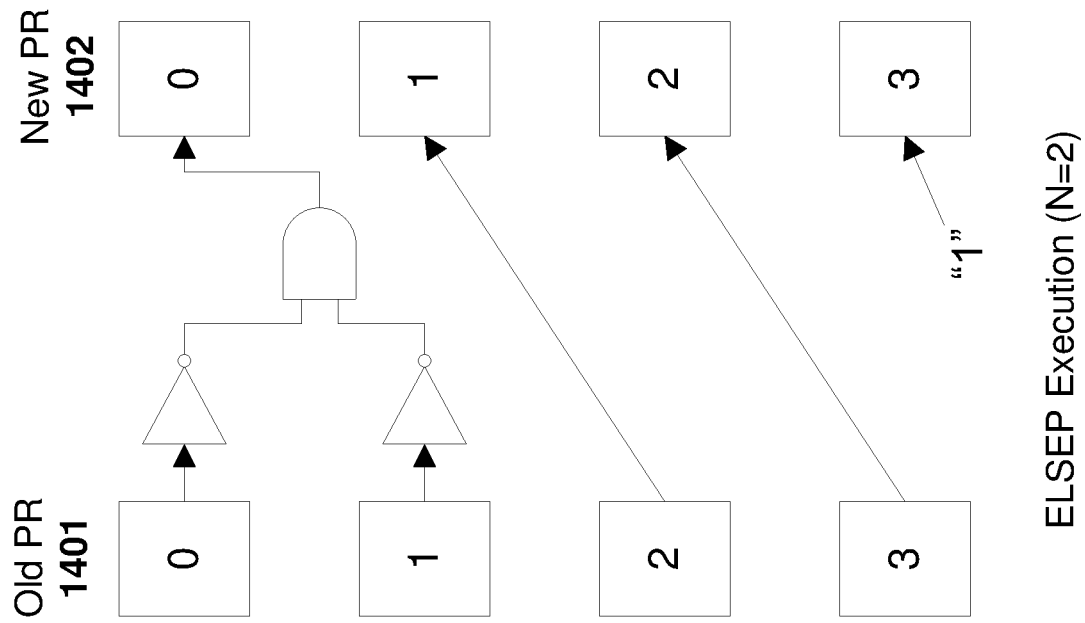
FIGS. 15A-B illustrate register operations associated with an ELSEP instruction for N=1 and N=2.
Figure 15A:
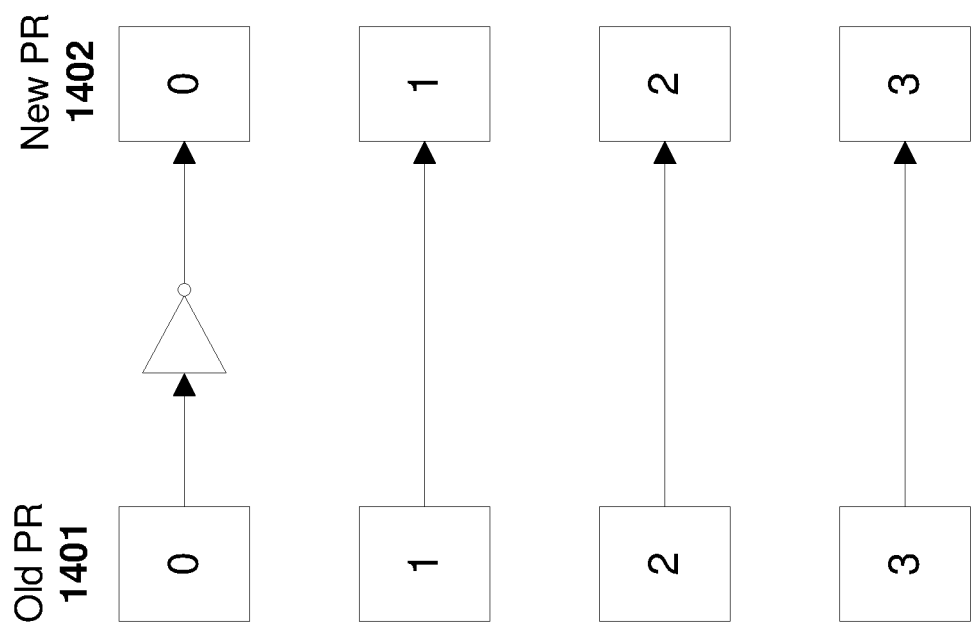

FIG. 15A illustrates the execution of ELSEP N where N=1. The ANDed together complement of PR [0 . . . N−1] is the complement of bit 0 of the old PR 1401, which is stored in bit 0 of the new PR 1402, as illustrated. No shift is performed (because N−1=0).

FIG. 15B illustrates the execution of ELSEP N where N=2. For N=2, bits 0 and 1 from the old PR 1401 are complemented and the results are ANDed. As illustrated, the bit resulting from the AND operation is stored in bit 0 of the new PR 1402. The remaining bits from the old PR 1401 are shifted right 1 bit position (because N−1=1) and a value of 1 is shifted into bit 3, as illustrated.

Figure 16B:
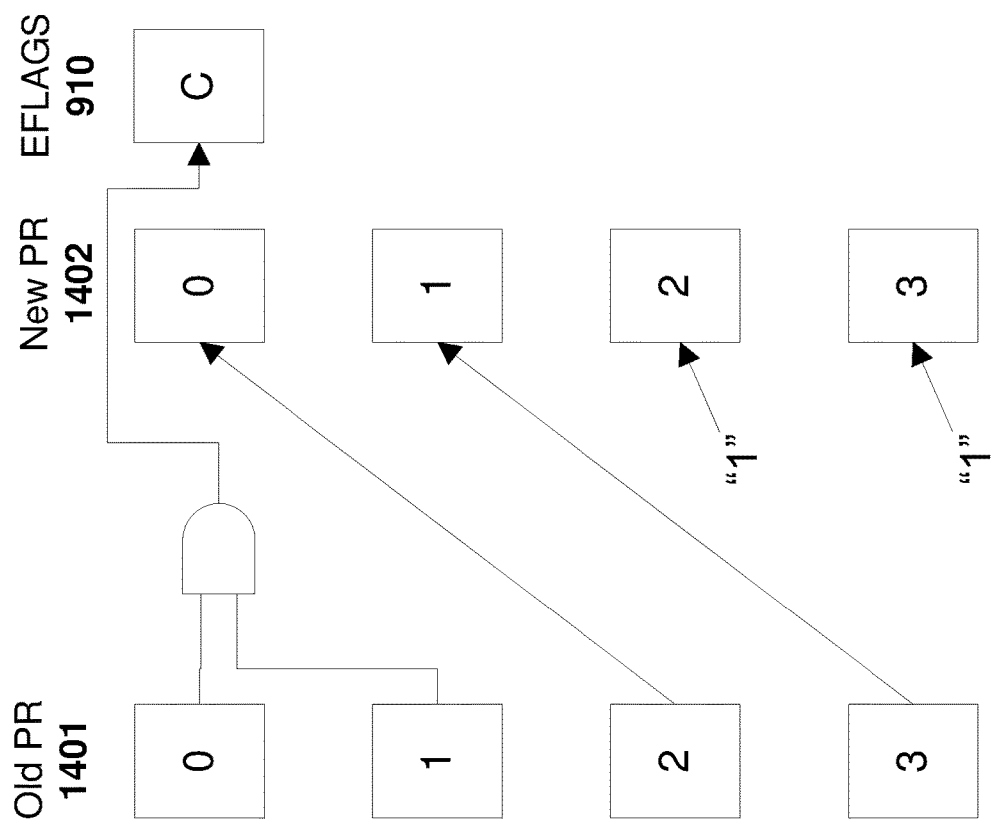
FIGS. 16A-B illustrates register operations associated with an ENDP instruction for N=1 and N=2.
Figure 16A:
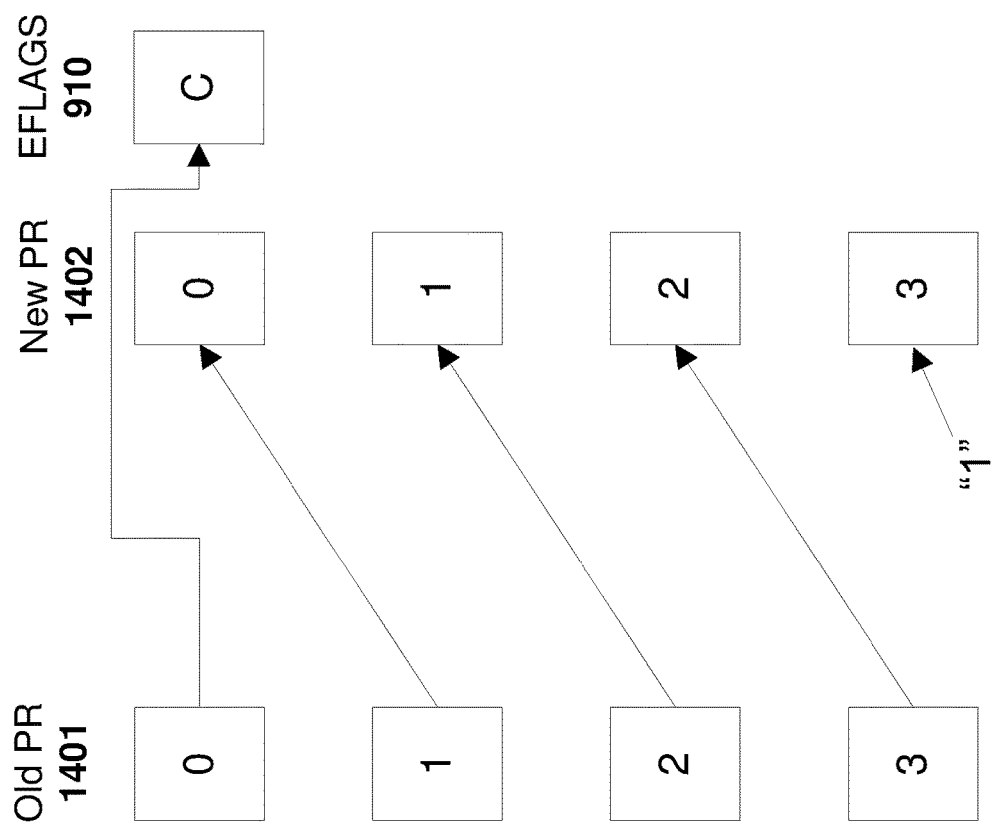

FIG. 16A illustrates the operation of ENDP for N=1. The value in bit position 0 of the old PR 1401 is stored within EFLAGS 910 (e.g., setting the zero flag (ZF)). As mentioned, the ENDP operation sets EFLAGS.ZF to the ANDed together PR[0 . . . N−1], which is equal to PR[0] for N=1. The bits in the PR register are then shifted right N times (1 time for N=1 in FIG. 16A) and a value is 1 is set in bit 3.

In FIG. 16B, for N=2, bits 0 and 1 are ANDed together and the result is stored in EFLAGS.ZF. The bits in the predicate register are shifted right 2 times (for N=2) and values of 1 are shifted into bit positions 2 and 3.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hardwired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A processor comprising:
a register set including a predicate register to store a set of predicate condition bits, the predicate condition bits to specify whether results of a particular predicated instruction sequence are to be retained or discarded; and
predicate execution logic to execute:
a current first predicate instruction to indicate a start of a new predicated instruction sequence by copying a new condition value from a processor control register in the register set to the predicate register; and
a second predicate instruction to cause the predicate execution logic to AND together the complemented values of bits 0 through N−1 of the predicate register to generate an AND-complemented result, shift the predicate condition bits in the predicate register by a value of N−1, and store the AND-complemented result back to the predicate register, wherein N is equal to a number of prior first predicate instructions which are part of a common nested block of program code, and N >1.

2. The processor as in claim 1 wherein the predicate condition bits in the predicate register are to be shifted in response to the current first predicate instruction to free space within the predicate register for the new condition value associated with the new predicated instruction sequence.

3. The processor as in claim 2 wherein the new condition value comprises a single Boolean value, wherein a value of 1 indicates that results of the new predicated instruction sequence are to be retained and a value of 0 indicates that the results of the new predicated instruction sequence are to be discarded.

4. The processor as in claim 1 wherein the predicate execution logic is further configured to execute a third predicate instruction to cause the predicate execution logic to AND together the values of bits 0 through N−1 of the predicate register to generate an ANDed result, shift the predicate register by a value of N, and store the ANDed result in the processor control register.

5. The processor as in claim 4 wherein the processor control register comprises the EFLAGS register.

6. The processor as in claim 4 wherein the predicate execution logic is further configured to execute fourth and fifth predicate instructions to cause the predicate execution logic to load or store predicate register values from or to a memory, respectively.

7. The processor as in claim 1 wherein the new predicated instruction sequence comprises a plurality of instructions whose semantics have been modified to read values from the predicate register rather than the processor control register during execution.

8. The processor as in claim 7 wherein the new predicated instruction sequence is executed only if there are no bits within the predicate register which are set equal to 0, allowing multiple conditions to be specified in the predicate register for a nested instruction sequence.

9. A method comprising:
storing a set of predicate condition bits in a predicate register of a register set, the predicate condition bits to specify whether results of a particular predicated instruction sequence are to be retained or discarded;
executing a current first predicate instruction, by predicate execution logic, to indicate a start of a new predicated instruction sequence;
responsively copying a new condition value from a processor control register in the register set to the predicate register; and
executing a second predicate instruction, by the predicate execution logic, to cause the predicate execution logic to AND together the complemented values of bits 0 through N−1 of the predicate register to generate an AND-complemented result, shift the predicate condition bits in the predicate register by a value of N−1, and store the AND-complemented result back to the predicate register, wherein N is equal to a number of prior first predicate instructions which are part of a common nested block of program code, and N >1.

10. The method as in claim 9 wherein the predicate condition bits in the predicate register are to be shifted in response to the current first predicate instruction to free space within the predicate register for the new condition value associated with the new predicated instruction sequence.

11. The method as in claim 10 wherein the new condition value comprises a single Boolean value, wherein a value of 1 indicates that results of the new predicated instruction sequence are to be retained and a value of 0 indicates that the results of the new predicated instruction sequence are to be discarded.

12. The method as in claim 9 further comprising:
executing a third predicate instruction to cause the predicate execution logic to AND together the values of bits 0 through N−1 of the predicate register to generate an ANDed result, shift the predicate register by a value of N, and store the ANDed result in the processor control register.

13. The method as in claim 12 wherein the processor control register comprises the EFLAGS register.

14. The method as in claim 12 further comprising: executing fourth and fifth predicate instructions to cause the predicate execution logic to load or store predicate register values from or to a memory, respectively.

15. The method as in claim 9 wherein the new predicated instruction sequence comprises a plurality of instructions whose semantics have been modified to read values from the predicate register rather than the processor control register during execution.

16. The method as in claim 15 wherein the new predicated instruction sequence is executed only if there are no bits within the predicate register which are set equal to 0, allowing multiple conditions to be specified in the predicate register for a nested instruction sequence.

17. A system comprising:
a memory for storing program code and data;
an input/output (IO) communication interface for communicating with one or more peripheral devices;
a network communication interface for communicatively coupling the system to a network; and
a processor having at least one processor core comprising:
a register set including a predicate register to store a set of predicate condition bits, the predicate condition bits to specify whether results of a particular predicated instruction sequence are to be retained or discarded; and
predicate execution logic to execute:
a current first predicate instruction to indicate a start of a new predicated instruction sequence by copying a new condition value from a processor control register in the register set to the predicate register; and
a second predicate instruction to cause the predicate execution logic to AND together the complemented values of bits 0 through N−1 of the predicate register to generate an AND-complemented result, shift the predicate condition bits in the predicate register by a value of N−1, and store the AND-complemented result back to the predicate register, wherein N is equal to a number of prior first predicate instructions which are part of a common nested block of program code, and N >1.

18. The system as in claim 17 wherein the predicate condition bits in the predicate register are to be shifted in response to the current first predicate instruction to free space within the predicate register for the new condition value associated with the new predicated instruction sequence.

19. The system as in claim 18 wherein the new condition value comprises a single Boolean value, wherein a value of 1 indicates that results of the new predicated instruction sequence are to be retained and a value of 0 indicates that the results of the new predicated instruction sequence are to be discarded.

20. The system as in claim 17 wherein the predicate execution logic is further configured to execute a third predicate instruction to cause the predicate execution logic to AND together the values of bits 0 through N−1 of the predicate register to generate an ANDed result, shift the predicate register by a value of N, and store the ANDed result in the processor control register.

21. The system as in claim 20 wherein the processor control register comprises the EFLAGS register.

22. The system as in claim 20 wherein the predicate execution logic is further configured to execute fourth and fifth predicate instructions to cause the predicate execution logic to load or store predicate register values from or to a memory, respectively.

23. The system as in claim 17 wherein the new predicated instruction sequence comprises a plurality of instructions whose semantics have been modified to read values from the predicate register rather than the processor control register during execution.

24. The system as in claim 23 wherein the new predicated instruction sequence is executed only if there are no bits within the predicate register which are set equal to 0, allowing multiple conditions to be specified in the predicate register for a nested instruction sequence.

* * * * *